(12) United States Patent
Davis et al.

(10) Patent No.: US 10,145,380 B1
(45) Date of Patent: Dec. 4, 2018

(54) THRUST BEARING SUSPENSION SYSTEM AND APPARATUS

(71) Applicant: Halliburton Energy Services, Inc., Houston, TX (US)

(72) Inventors: Gregory Austin Davis, Broken Arrow, OK (US); Larry James Parmeter, Broken Arrow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 364 days.

(21) Appl. No.: 15/086,825

(22) Filed: Mar. 31, 2016

Related U.S. Application Data

(60) Provisional application No. 62/145,282, filed on Apr. 9, 2015.

(51) Int. Cl.
| | | |
|---|---|---|
| F04D 1/06 | (2006.01) | |
| F04D 13/08 | (2006.01) | |
| F04D 25/06 | (2006.01) | |
| F04D 29/04 | (2006.01) | |
| F04D 29/041 | (2006.01) | |
| F16C 35/06 | (2006.01) | |

(52) U.S. Cl.
CPC .............. *F04D 29/041* (2013.01); *F04D 1/06* (2013.01); *F04D 13/08* (2013.01); *F16C 35/06* (2013.01)

(58) Field of Classification Search
CPC .......... F04D 1/06; F04D 13/08; F04D 13/086; F04D 13/10; F04D 13/0633; F04D 25/0686; F04D 25/062; F04D 29/041; F04D 29/0467; F16C 35/06
See application file for complete search history.

(56) References Cited

U.S. PATENT DOCUMENTS

| | | | | |
|---|---|---|---|---|
| 3,215,083 | A | * | 11/1965 | Sarles ..................... F04D 13/06 310/88 |
| 5,160,240 | A | | 11/1992 | Wilson |
| 5,209,577 | A | * | 5/1993 | Swatek ............... F04D 29/0465 384/220 |
| 5,722,812 | A | * | 3/1998 | Knox ....................... F04D 1/06 415/199.1 |
| 6,017,184 | A | | 1/2000 | Aguilar et al. |
| 6,068,444 | A | * | 5/2000 | Sheth ....................... F04D 1/06 415/104 |

(Continued)

OTHER PUBLICATIONS

Nowacki, J.et al., "Microstructure and characteristics of high dimension brazed joints of cermets and steel," Journal of Achievements in Materials and Manufacturing Engineering, Dec. 2009, vol. 37, Issue 2, 448-457, 10 pages.

*Primary Examiner* — Igor Kershteyn
(74) *Attorney, Agent, or Firm* — McGuireWoods LLP

(57) ABSTRACT

A thrust bearing suspension system and apparatus is described. A thrust bearing suspension system includes an electric submersible pump including at least two impellers, each of the at least two impellers paired with a diffuser, a thrust bearing set between two of the at least two impellers, the thrust bearing set comprising a bushing moveable axially between the two impellers and pivotable along a bushing-to-diffuser pivot key, and a retaining ring on a rim of the bushing constraining the axial movement of the bushing, the retaining ring extending across a radial tolerance between the bushing and at least one of the diffusers.

16 Claims, 5 Drawing Sheets

(56) References Cited

U.S. PATENT DOCUMENTS

| | | | | |
|---|---|---|---|---|
| 6,238,096 B1* | 5/2001 | Allen | .................... | F16C 23/082 |
| | | | | 384/495 |
| 6,780,037 B1* | 8/2004 | Parmeter | .............. | H01R 13/523 |
| | | | | 439/191 |
| 7,575,413 B2* | 8/2009 | Semple | .................... | F04D 1/063 |
| | | | | 384/275 |
| 8,070,426 B2 | 12/2011 | Brunner et al. | | |
| 8,684,679 B2 | 4/2014 | Tetzlaff et al. | | |
| 2002/0125777 A1* | 9/2002 | Parmeter | ................ | F16C 27/02 |
| | | | | 310/90 |
| 2012/0098358 A1* | 4/2012 | Prieto | .................. | F04D 29/044 |
| | | | | 310/51 |
| 2015/0023815 A1* | 1/2015 | Tetzlaff | .................... | F04D 1/04 |
| | | | | 417/365 |

* cited by examiner

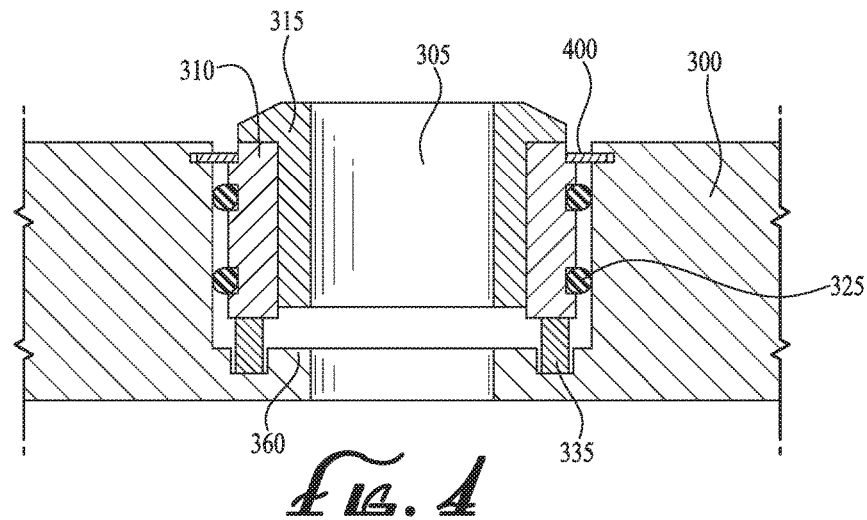
FIG. 4
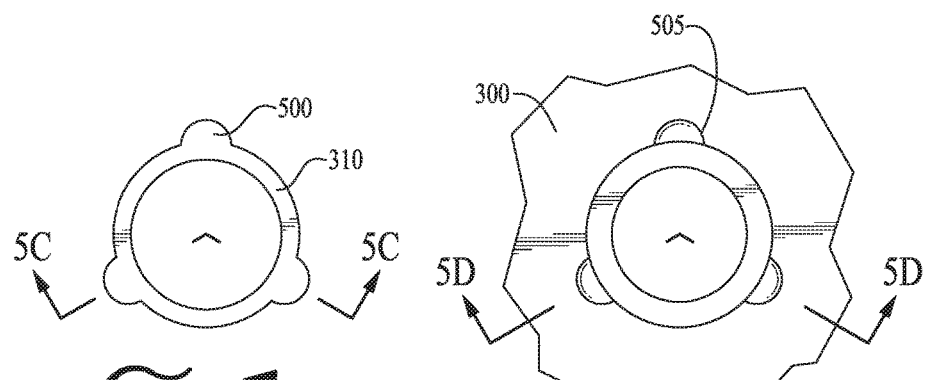
FIG. 5A
FIG. 5B
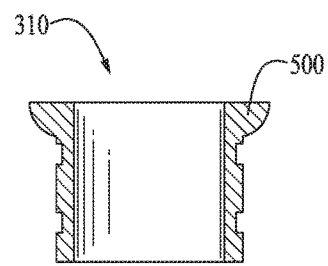
FIG. 5C
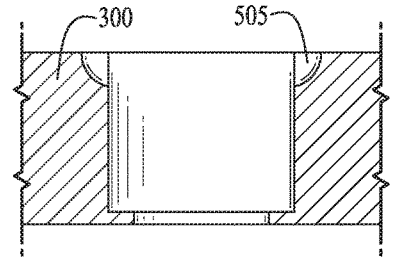
FIG. 5D

THRUST BEARING SUSPENSION SYSTEM AND APPARATUS

CROSS REFERENCE TO RELATED APPLICATIONS

This application claims the benefit of U.S. Provisional Application No. 62/145,282 to Davis et al., filed Apr. 9, 2015 and entitled "THRUST BEARING SUSPENSION SYSTEM AND APPARATUS," which is hereby incorporated by reference in its entirety.

BACKGROUND OF THE INVENTION

1. Field of the Invention

Embodiments of the invention described herein pertain to the field of submersible pump thrust bearings. More particularly, but not by way of limitation, one or more embodiments of the invention enable a thrust bearing suspension system and apparatus for electric submersible pumps.

2. Description of the Related Art

Submersible pump assemblies are used to artificially lift fluid in deep underground formations to the surface. In this way, the fluid can be collected, separated, refined and sold. These fluids are typically water, oil, natural gas and/or other fluids containing hydrocarbons. A conventional electric submersible pump (ESP) assembly consists of, from bottom to top, an electrical motor, seal section (also sometimes referred to as a motor protector), pump intake and multi-stage centrifugal pump, which are all connected together with shafts. The electrical motor supplies torque to the shafts, which provides power to the centrifugal pump. The electrical motor is generally connected to a power source located at the surface of the well using a motor lead cable. The entire assembly is placed into the well inside a casing, which casing separates the submersible pump assembly from the well formation. Perforations in the casing allow well fluid to enter the casing.

Many of these underground formations also contain well born solids, such as consolidated and unconsolidated sand. The hydrocarbon laden fluids must pass through the sand on their way to the pump intake, and ultimately to the surface. When this occurs, the hydrocarbon fluids carry the sand through pump components. Such well-born solids may have severe abrasive effects on the submersible pump components and increase the heat generated during use, since abrasive wear to the pump causes inefficiency in its operation. As a result, careful attention to fluid and pressure management in submersible pump systems is needed in order to improve the production of hydrocarbon laden fluids from subsurface formations.

One approach to curbing erosive wear to pump components is through the use of abrasion resistant trim. Abrasion resistant trim involves employing pump components made of hard materials to protect those surfaces from abrasion. Typically tungsten carbide, silicon carbide, titanium carbide, or other materials having similar properties and at least as hard as the abrasives in the well fluid, are used to create hard surfaces of the components in the pump that are most exposed to the path of abrasives in pumped fluid.

Thrust bearing surfaces are one primary example of a pump component made out of tungsten carbide, silicon carbide or titanium carbide. FIG. 1A and FIG. 1B illustrate a conventional stationary bushing 100. FIG. 1C illustrates a conventional flanged sleeve 105. Together, conventional stationary bushing 100 and conventional flanged sleeve 105 make up a thrust bearing set referred to as "abrasion resistant trim", often abbreviated as "AR trim". Conventional stationary bushing 100 of FIGS. 1A and 1B is attached to the wall of the diffuser of the submersible pump and does not rotate. Traditionally, conventional stationary bushing 100 is pressed in and affixed to a diffuser with an interference fit or is glued in place. In conventional assemblies, conventional flanged sleeve 105 of FIG. 1C is keyed to the shaft of a submersible pump and rotates with the shaft as fluid is pumped to the surface of a well. The conventional stationary bushing 100 extends concentrically around the flanged sleeve 105.

A drawback to the use of AR trim is that the hard abrasion resistant surfaces of the thrust bearings collide during transitional contact. Because the thrust bearing surfaces are so hard, they are brittle and tend to break if they collide. Collisions are common during the initial pump assembly process, during transportation of the pump, and also occur during operation of the pump. In particular, collisions may occur, for example, when a flanged sleeve is lifted from its normal riding position and then falls back down into the stationary bearing. FIGS. 2A and 2B illustrate this exemplary type of transitional contact. As shown in FIG. 2A, conventional flanged sleeve 105 is lifted, and in FIG. 2B has fallen downwards to collide with conventional stationary bushing 100. In another example, a pump impeller may move from the upward operating position to the downwards position and make contact with a standoff sleeve or the flanged sleeve. It yet another example, conventional flanged sleeve 105 may tilt out of alignment with conventional bushing 100 resulting in side loading on the bearings, such as illustrated in FIG. 2C.

It would be an advantage for brittle abrasion resistant trim of electric submersible pump assemblies to be better suited to withstand transitional contact. Therefore, there is a need for a thrust bearing suspension system and apparatus for electric submersible pumps.

BRIEF SUMMARY OF THE INVENTION

A thrust bearing suspension system and apparatus is described. An illustrative embodiment of a thrust bearing suspension apparatus includes an impeller and diffuser pump stage having a shaft extending longitudinally therethrough, the shaft having an axis of rotation, a flanged sleeve secured to the shaft, wherein the flanged sleeve is paired with a bushing positioned concentrically between the flanged sleeve and the diffuser to form a thrust bearing set, the bushing including at least two circumferential grooves about an outer diameter of the bushing, wherein an elastomeric ring is seated in each of the at least two circumferential grooves, a buffer member extending longitudinally between a bottom of the bushing and the diffuser, a retaining ring extending across a radial tolerance between a rim proximate a top of the bushing and the diffuser, and the bushing comprising a rounded outer diameter rockable along the diffuser to align with the axis of rotation of the shaft. In some embodiments, the buffer member is one of a spring or an elastomeric insert. In certain embodiments, the pump stage is of one of a surface pump stage or a downhole pump stage. In some embodiments, the diffuser includes a portion surrounding the buffer member defining a bushing stop. In certain embodiments, a portion of the diffuser surrounding the bushing has a recession that receives the bushing rounded outer diameter. In some embodiments, the retaining ring is a snap ring. In certain embodiments, the bushing further comprising a rounded ant-rotation protrusion proximate the rim of the bushing.

An illustrative embodiment of a thrust bearing suspension system includes a thrust bearing set of an electric submersible pump assembly including a compliant bushing inserted coaxially between a diffuser and a flanged sleeve, a spring extending between a bottom of the bushing and the diffuser, and a pivot key coupling the diffuser and the compliant bushing. In some embodiments the thrust bearing suspension system includes a bushing stop formed at a base of the diffuser, and a retaining ring extending between a rim of the compliant bushing and the diffuser across a radial tolerance. In certain embodiments, the pivot key comprises a protruding rounded surface on the compliant bushing. In some embodiments, the protruding rounded surface projects symmetrically about a waist of the compliant bushing. In certain embodiments, wherein the bushing includes an anti-rotation protrusion proximate a top rim of the compliant bushing.

An illustrative embodiment of a thrust bearing suspension system includes an electric submersible pump comprising at least two impellers, each of the at least two impellers paired with a diffuser, a thrust bearing set between two of the at least two impellers, the thrust bearing set comprising a bushing moveable axially between the two impellers and pivotable along a bushing-to-diffuser pivot key, and a retaining ring on a rim of the bushing constraining the axial movement of the bushing, the retaining ring extending across a radial tolerance between the bushing and at least one of the diffusers. In some embodiments, the bushing-to-diffuser pivot key includes a female cradle in the at least one diffuser and a rounded protruding surface on an outer diameter of the bushing that pairs with the female cradle. In some embodiments, the thrust bearing suspension system includes a bushing-to-diffuser anti-rotation key. In certain embodiments, the bushing-to diffuser anti-rotation key comprises a rounded protrusion proximate a top rim of the bushing and a paired indentation in the diffuser.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

The above and other aspects, features and advantages of the invention will be more apparent from the following more particular description thereof, presented in conjunction with the following drawings wherein:

FIG. 4 is a cross sectional view of a thrust bearing suspension system of an illustrative embodiment.

FIG. 5A is a top plan view of a male anti-rotation key of an illustrative embodiment.

FIG. 5B is a top plan view of a female anti-rotation key of an illustrative embodiment.

FIG. 5C is a cross sectional view across line 5C-5C of FIG. 5A of a male anti-rotation key of an illustrative embodiment.

FIG. 5D is a cross sectional view across line 5D-5D of FIG. 5B of a female anti-rotation key of an illustrative embodiment.

Figure 1A:
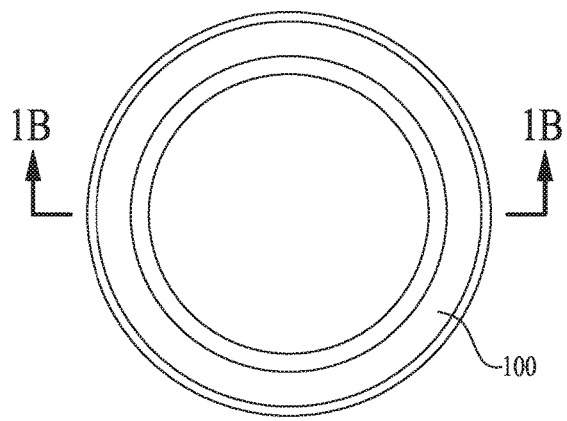
FIG. 1A is a top plan view of a conventional stationary bearing of a thrust bearing set of the prior art.
Figure 1B:
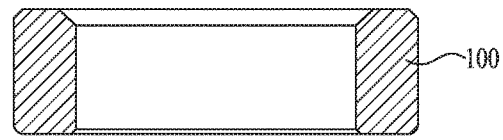
FIG. 1B is a cross sectional view across line 1B-1B of FIG. 1 A of a conventional stationary bearing of a thrust bearing set of the prior art.
Figure 1C:
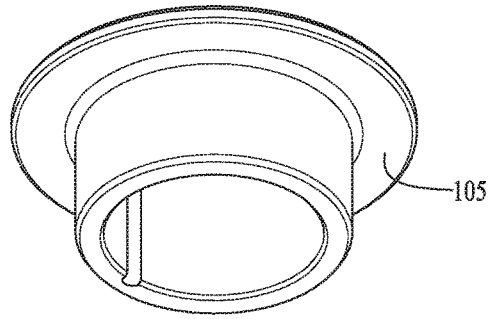
FIG. 1C is a bottom perspective view of a conventional flanged sleeve of a thrust bearing set of the prior art.
Figures 2A, 2B, 2C:
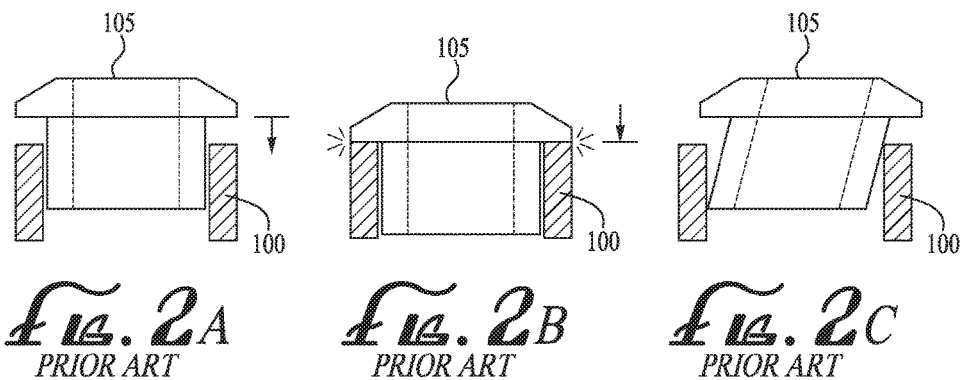
FIG. 2A is a cross sectional view illustrating transitional contact of the prior art showing a conventional flanged sleeve lifted upwards.
FIG. 2B is a cross sectional view illustrating transitional contact of the prior art showing a conventional flanged sleeve falling downwards from the lifted position to collide with a conventional stationary bearing.
FIG. 2C is a cross sectional view illustrating misalignment of conventional flanged sleeve with respect to a conventional stationary bearing of the prior art.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

A thrust bearing suspension system and apparatus will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a snap ring may include one or more snap rings.

"Coupled" refers to either a direct connection or an indirect connection (e.g., at least one intervening connection) between one or more objects or components. The phrase "directly attached" means a direct connection between objects or components.

"Downstream" refers to the direction substantially with the primary flow of fluid when the electric submersible pump (ESP) is in operation. Thus by way of example and without limitation, in a vertical downhole ESP assembly, the downstream direction is towards the top of the assembly and/or the surface of the well. As used herein, "top" refers to the downstream side of a pump assembly component.

"Upstream" refers to the direction substantially opposite the primary flow of fluid when the ESP pump is in operation. Thus by way of example and without limitation, in a vertical downhole ESP assembly, the upstream direction is towards the bottom of the assembly and/or deeper in the ground. As used herein, "bottom" refers the upstream side of a pump assembly component.

As used in this specification and the appended claims, the terms "inner" and "inwards" with respect to a bearing or other pump assembly component refer to the radial direction towards the center of the shaft of the pump assembly and/or the aperture through which the shaft would extend.

As used in this specification and the appended claims, the terms "outer" and "outwards" with respect to a bearing or other pump assembly component refer to the radial direction away from the center of the shaft of the pump assembly and/or the aperture through which the shaft would extend.

Illustrative embodiments of the invention described herein provide for a thrust bearing suspension system that may protect hardened, abrasion resistant thrust bearings from damage resulting from transitional contact. Illustrative embodiments employ a compliant abrasion resistant bushing, not as a radial bearing, but instead as a stationary member of a thrust bearing set. The elastomeric rings of the compliant bushing may separate the bushing from the diffuser by creating a radial tolerance, and may allow movement of the bushing along the axial plane to absorb impact. An impact buffer, which may for example be rubber or a spring, may be placed on the bottom of the bushing in between the bushing and the carrier or diffuser. Upwards and downwards bushing stops may limit the axial movement of the bushing such that the bushing "bounces" to absorb impacts, but does not travel enough to exert upward force on the impeller. In some embodiments, a bushing-to-diffuser pivot key and/or anti-rotation key may be employed to prevent rotation of the bushing and/or allow the bushing to rock in response to tilting of the shaft and sleeve and/or align with a moving axis of rotation. The compliant bushing and/or impact buffer of illustrative embodiments may reduce impact from transitional contact by creating a suspension system for the thrust bearings.

Compliant bushings are conventionally employed as radial bearings. Those of skill in the art would not expect a compliant bushing to be effective as a stationary thrust bearing, since to function properly, a stationary bearing of a thrust bearing set must not rotate in the bore. Compliant bushings are loosely fit in the bore instead of the conventionally preferred interference fit for stationary thrust bearings. To combat undesirable rotation or tilting of the compliant bushing, a bushing-to-diffuser pivot key and/or anti-rotation key may be employed in illustrative embodiments. The loose-fitting nature of the bushing may allow the bushing to "bounce" in order to absorb shock from impact. An internal retaining ring, such as a snap ring, may extend between the compliant bushing and the diffuser, which may combat up-travel of the compliant bushing and/or upward pressure on the impeller, whilst a bushing stop may limit downward movement of the bushing.

Figure 3:
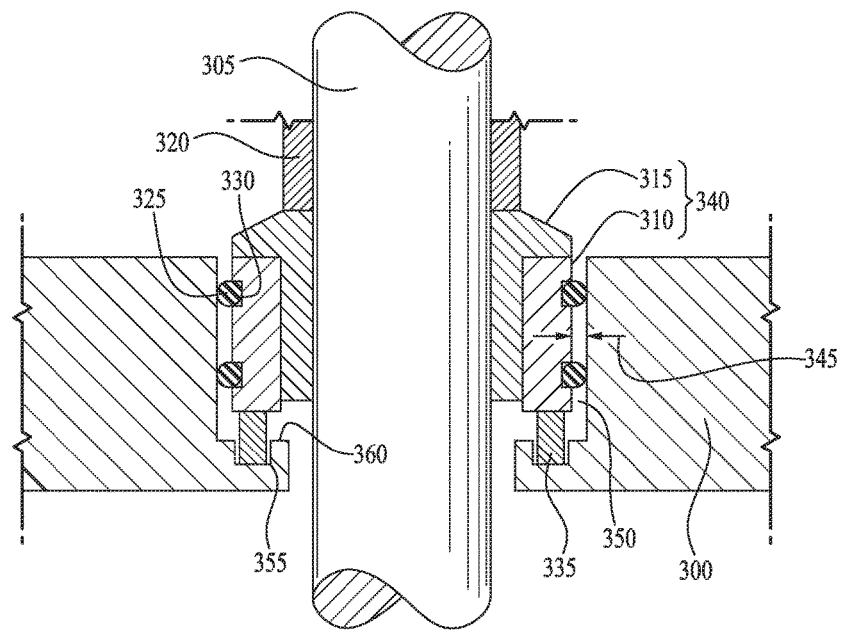
FIG. 3 is a cross sectional view of a thrust bearing suspension system of an illustrative embodiment.

FIG. 3 is an illustrative embodiment of a thrust bearing suspension system including AR trim of an illustrative embodiment. As shown in FIG. 3, bushing 310 is paired with rotating member 315 to form thrust bearing set 340. Rotating member 315 may include a flange that extends over bushing 310 on the top side of bushing 310. Thrust bearing set 340 carries the thrust (axial and downthrust loads) of the multi-stage centrifugal pump, ESP pump, horizontal surface pump or other pump in which thrust bearing set 340 may be employed. In the example of FIG. 3, thrust bearing set 340 is placed in a stage of a centrifugal pump including impeller 320 paired with diffuser 300. Bearing set 340 may be included in one or more stages of the centrifugal pump. Bushing 310 may be the stationary member of bearing set 340 in that bushing 310 may not substantially rotate about the pump's longitudinal axis during operation of the pump. Rotating member 315 of bearing set 340 may be keyed to shaft 305 such that rotating member 315 rotates with shaft 305 during operation of the pump. Diffuser 300 remains stationary during operation of the pump. In some embodiments, diffuser 300 may instead be a carrier inserted into the assembly that does not provide any hydraulic performance, but simply houses thrust bearing set 340—for example when the diffuser geometry does not have enough capacity to hold thrust bearing set 340.

Bushing 310 of bearing set 340 may be a compliant bushing and include one or more grooves 330 circumferentially around its outer diameter. Grooves 300 may be molded or machined into the outer diameter of bushing 310. One, two or three or more grooves 330 may be included. As shown in FIG. 3, one groove 300 is on each of the top third and bottom third of bushing 310. Elastomeric rings 325 may be seated into grooves 330 and extend circumferentially around the outer diameter of bushing 310. Elastomeric ring 325 may be ethylene propylene diene monomer, commonly referred to as EPDM rubber, a fluoroelastomer based upon an alternating copolymer of tetrafluoroethylene and propylene, or another similar material. Compliant bushing 310 with elastomeric rings 325 may be placed in diffuser bore 350, such that elastomeric rings 325 create a radial tolerance 345 between bushing 310 and diffuser 300. Bushing 310 may be self-adjusting to the axis of shaft 305 to reduce impact, without rotating during operation of the pump. For example, the compliant bushing 310 of illustrative embodiments may rock to align with the axis of rotation of shaft 305 and rotating member 315, as for example illustrated in FIG. 6E. The diameter of bore 350 may be slightly smaller than the outer diameter of elastomeric rings 325, such that friction of elastomeric rings 325 against diffuser 300 may hold bushing 310 in place, as opposed to the conventionally employed interference fit or glue.

Impact buffer 335 may be positioned at the bottom (upstream side) of bushing 310, in between bushing 310 and diffuser 300, and/or may be contained between stationary diffuser 300 counter bore and bushing 310. Notch 355 at the base of diffuser 300 may be molded or machined into diffuser 300 to create a secure pocket for impact buffer 335 underneath bushing 310. Notch 355 may form bushing stop 360 to limit downward movement of bushing 310. Impact buffer 335 may be cylindrical and/or annular in shape, or may be rectangular, square or rounded and extend between the bottom (upstream side) of bushing 310 and diffuser 300. Impact buffer 335 may extend around the bottom of bushing 310, or multiple impact buffers 335 may be dispersed at intervals. Impact buffer may be made of a material similar to that of elastomeric ring 325, may be rubber, may be a spring or another similarly resilient material. In one example, impact buffer 335 may be a wound wire spring similar to a recoil spring used in a semi-automatic firearm. Impact buffer 335 may have a higher spring rate than diffuser 300 and the abrasion resistant material of bushing 310. This may reduce impact forces at the point of contact by allowing movement of bushing 310 on an axial plane (parallel to shaft 300).

FIG. 4 illustrates an exemplary suspension apparatus of illustrative embodiments. As shown in FIG. 4, retaining rings 400, such as an internal snap ring, may be attached at the top of bushing 310. Retaining rings 400 may be snap rings or a clips and may be made of stainless steel or a nickel-copper alloy, for example. As shown in FIG. 4, retaining ring 400 is secured on bushing 310 just below the flange of rotating member 315, and also secured to diffuser 300. Retaining rings 400 may extend between bushing 310 and diffuser 300, across radial tolerance 345, to prevent bushing 310 from coming upwards out of bore 350, acting as an up-travel stop. Bushing stop 360 and snap rings 400 together limit the axial movement of bushing 310, whilst still permitting enough axial bounce to absorb impacts.

Figure 5E:
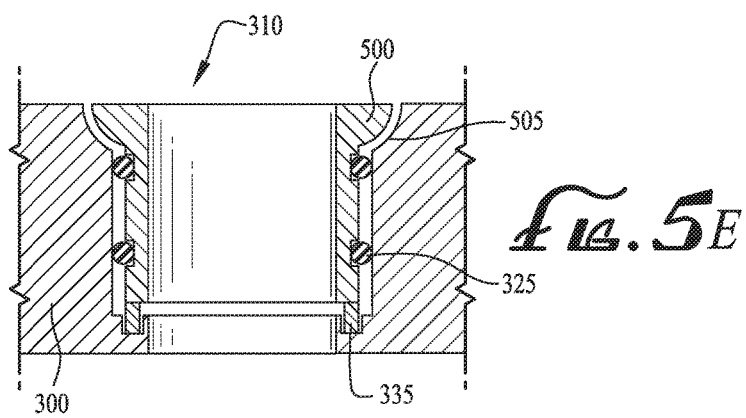
FIG. 5E is a cross sectional view of a bushing to diffuser anti-rotation key of an illustrative embodiment.

A bushing-to-diffuser pivot key and/or anti-rotation key may be employed to prevent bushing 310 from excessive rotation about shaft 305 and/or to permit bushing 310 to rock in response to tilting of the axis of rotation of shaft 305 and/or rotating member 315. FIGS. 5A-5E illustrate an exemplary embodiment of an anti-rotation key. In order to function properly as a thrust bearing, bearing set 340 should employ hydrodynamic properties as rotating member 315 rotates within a surrounding "stationary" bearing that does not rotate. The rotation of rotating member 315 inside a non-rotating bushing 310 pulls fluid in between the surfaces of the bearings and forms a thin fluid film between the members of the bearing set. Because bushing 310 may be a compliant bushing that is self-adjusting about shaft 305, rather than a conventional interference bushing, illustrative embodiments may employ additional features to combat rotation and/or side loading of bushing 310 to maintain the hydrodynamic properties of bearing set 340. As shown in FIG. 5A, the upper rim of bushing 310 may include rounded protrusions 500. One or more rounded protrusions 500 may extend around the circumference of the upper surface of bushing 310 to create a male anti-rotation key. Diffuser 300 may have female indentations 505 corresponding to protrusions 500, such that protrusions 500 may fit like a puzzle piece, or lock and key, into indentations 505. In this manner, bushing 310 may be prevented from rotating around shaft 305. As illustrated in FIG. 5E, indentations 505 may be slightly larger than protrusions 500 and/or extend axially along diffuser 300 above and/or below protrusions 500, to permit bushing 310 to bounce axially whilst protrusions 500 slide longitudinally along indentations 505 without rotating. In some embodiments, protrusions 500 may be at the bottom rim of bushing 310 rather than, or in addition to, the top rim.

Figure 6A:
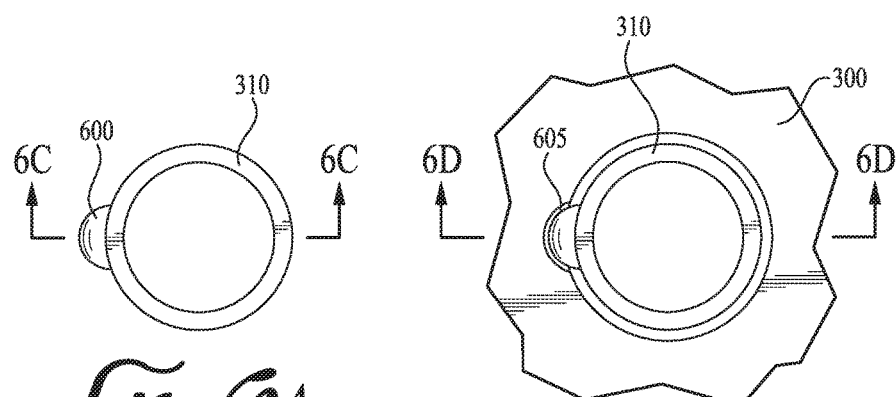
FIG. 6A is a top plan view of a male pivot key of an illustrative embodiment.
Figure 6B:
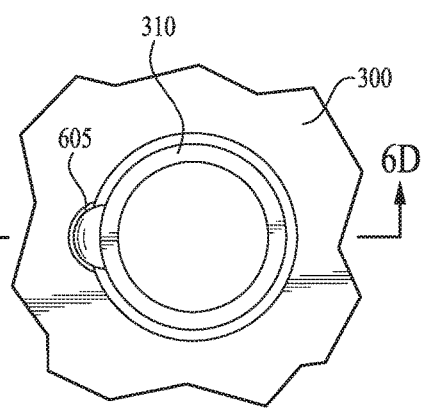
FIG. 6B is a top plan view of a male pivot key inserted into a female pivot keyhole of an illustrative embodiment.
Figure 6C:
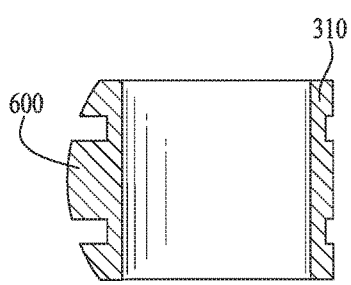
FIG. 6C is a cross sectional view across line 6C-6C of FIG. 6A of a male pivot key of an illustrative embodiment.
Figure 6D:
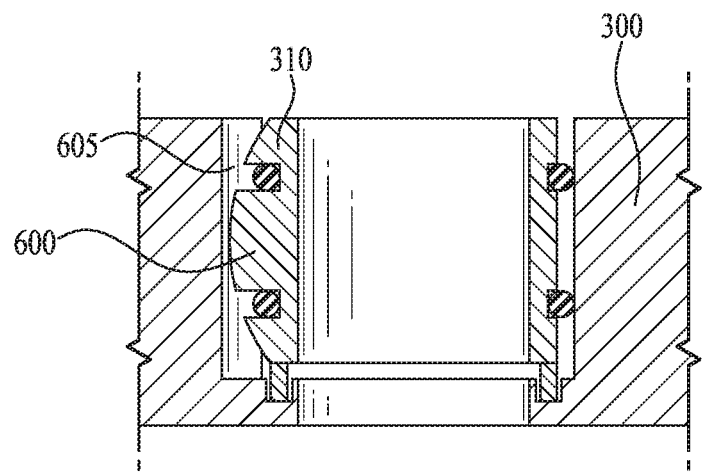
FIG. 6D is a cross sectional view across line 6D-6D of FIG. 6B of a male pivot key inserted into a female pivot keyhole of an illustrative embodiment.

FIGS. 6A-6E illustrate an embodiment of a bushing-to-diffuser pivot key. As shown in FIG. 6C, rounded surface 600 may project from the waist and/or middle section of bushing 310's outer diameter to form a curved or spherical outer surface of bushing 310. Rounded surface 600 may form a curved rocker or runner on outer diameter of bushing 310. Diffuser 300 may include a corresponding cradle 605 to receive rounded surface 600. In other embodiments, a dowel pin may be employed to prevent rotation of bushing 310.

Figure 6E:
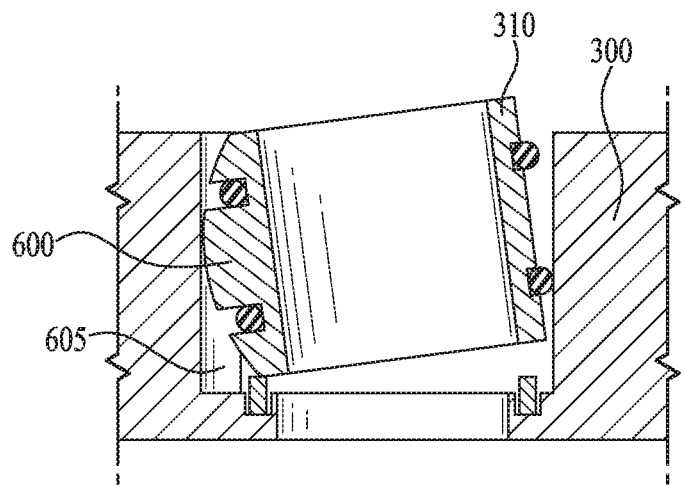
FIG. 6E is a cross sectional view of bushing-to-diffuser pivot key in a pivoted position of an illustrative embodiment.

FIG. 6E illustrates the self-aligning or rocking feature of illustrative embodiments of bushing 310. As shown in FIG. 6E rounded surface 600 may allow bushing 310 to rock along cradle 605 of diffuser 300 bore in response to motion (tilt) of shaft 305, rotating member 315 and/or movement of the pump, similar to runners of a rocking chair. In this fashion, bushing 310 may move axially up and down, as well as remain aligned with the axis of rotation of rotating member 315 (rock) so as to provide hydrodynamic thrust support.

Illustrative embodiments may provide a suspension system for abrasion resistant thrust bearings. The compliant bushing and impact buffer of illustrative embodiments may allow the thrust bearings of illustrative embodiments to move upwards and downwards on an axial plane, within defined bounds, in order to absorb impact from transitional contact. A bushing stop and/or up-travel snap ring may limit the extent of movement in an axial direction. An anti-rotation key and/or bushing-to-diffuser pivot key may prevent rotation of the bushing about the longitudinal axis, and may allow the bushing to remain aligned with the pump's axis of rotation. In this fashion, illustrative embodiments may allow just enough movement of bushing 310 to handle shock from transitional contact impacts, but still retain its hydrodynamic properties and function as a thrust bearing capable of carrying axial and downthrust loads.

Thus, the invention described herein provides one or more embodiments of a thrust bearing suspension system and apparatus. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A thrust bearing suspension apparatus comprising:
   an impeller and diffuser pump stage having a shaft extending longitudinally therethrough, the shaft having an axis of rotation;
   a flanged sleeve secured to the shaft, wherein the flanged sleeve is paired with a bushing positioned concentrically between the flanged sleeve and the diffuser to form a thrust bearing set;
   the bushing comprising at least two circumferential grooves about an outer diameter of the bushing, wherein an elastomeric ring is seated in each of the at least two circumferential grooves;
   a buffer member extending longitudinally between a bottom of the bushing and the diffuser;
   a retaining ring extending across a radial tolerance between a rim proximate a top of the bushing and the diffuser; and
   the bushing comprising a rounded outer diameter rockable along the diffuser to align with the axis of rotation of the shaft.

2. The thrust bearing suspension apparatus of claim 1, wherein the buffer member is one of a spring or an elastomeric insert.

3. The thrust bearing suspension apparatus of claim 1, wherein the pump stage is of one of a surface pump stage or a downhole pump stage.

4. The thrust bearing suspension apparatus of claim 1, wherein the diffuser comprises a portion surrounding the buffer member defining a bushing stop.

5. The thrust bearing suspension apparatus of claim 1, wherein a portion of the diffuser surrounding the bushing has a recession that receives the bushing rounded outer diameter.

6. The thrust bearing suspension apparatus of claim 1, wherein the retaining ring is a snap ring.

7. The thrust bearing suspension apparatus of claim 1, wherein the bushing further comprising a rounded ant-rotation protrusion proximate the rim of the bushing.

8. A thrust bearing suspension system comprising:
   a thrust bearing set of an electric submersible pump assembly comprising:
     a compliant bushing inserted coaxially between a diffuser and a flanged sleeve;
     a spring extending between a bottom of the bushing and the diffuser; and
     a pivot key coupling the diffuser and the compliant bushing.

9. The thrust bearing suspension system of claim 8, further comprising:
   a bushing stop formed at a base of the diffuser; and
   a retaining ring extending between a rim of the compliant bushing and the diffuser across a radial tolerance.

10. The thrust bearing suspension system of claim 8, wherein the pivot key comprises a protruding rounded surface on the compliant bushing.

11. The thrust bearing suspension system of claim 10, wherein the protruding rounded surface projects symmetrically about a waist of the compliant bushing.

12. The thrust bearing suspension system of claim 8, wherein the bushing comprises an anti-rotation protrusion proximate a top rim of the compliant bushing.

13. A thrust bearing suspension system comprising:
   an electric submersible pump comprising at least two impellers, each of the at least two impellers paired with a diffuser;
   a thrust bearing set between two of the at least two impellers, the thrust bearing set comprising a bushing moveable axially between the two impellers and pivotable along a bushing-to-diffuser pivot key; and
   a retaining ring on a rim of the bushing constraining the axial movement of the bushing, the retaining ring extending across a radial tolerance between the bushing and at least one of the diffusers.

14. The thrust bearing suspension system of claim 13, wherein the bushing-to-diffuser pivot key comprises a female cradle in the at least one diffuser and a rounded protruding surface on an outer diameter of the bushing that pairs with the female cradle.

15. The thrust bearing suspension system of claim 13, comprising a bushing-to-diffuser anti-rotation key.

16. The thrust bearing suspension system of claim 15, wherein the bushing-to diffuser anti-rotation key comprises a rounded protrusion proximate a top rim of the bushing and a paired indentation in the diffuser.

* * * * *